United States Patent [19]
Conan

[11] Patent Number: 6,072,866
[45] Date of Patent: Jun. 6, 2000

[54] PATH REPLACEMENT SCHEME

[75] Inventor: Loïc Conan, Lambersart, France

[73] Assignee: Northen Telecom Limited, Montreal, Canada

[21] Appl. No.: 08/848,336

[22] Filed: Apr. 30, 1997

[51] Int. Cl.⁷ .................................................. H04M 7/00
[52] U.S. Cl. ........................................... 379/220; 379/207
[58] Field of Search ..................................... 379/201, 207, 379/210, 211, 212, 213, 214, 219, 220, 221, 229

[56] References Cited

U.S. PATENT DOCUMENTS 5,790,638  8/1998  Bertacchi ............................ 379/211 X

OTHER PUBLICATIONS

International Standard ISO/IEC 13863: 1995 (E), First Edition Nov. 1, 1995; Annex A "Circumstances in Which ANF–Pr Might be Invoked".

Primary Examiner—Scott L. Weaver
Attorney, Agent, or Firm—Lee, Mann, Smith, McWilliams, Sweeney & Ohlson

[57] ABSTRACT

In a telecommunications network which supports path replacement, an improved path replacement scheme is described for use after a supplementary service call has been carried out. The basic call and the supplementary call involve at least a basic call originating node, a diverting node and a diverted-to node of the telecommunications network. Where several methods are provided for carrying out the supplementary service, an identifier is included in one of the messages sent to the diverted-to node which identifies which method is intended for, or has been used for the supplementary service call. In response to this identifier, the diverted-to node either invokes a path replacement when the supplementary service call has been established over a non-optimum path or suppresses path replacement if the call is known to be optimum.

34 Claims, 7 Drawing Sheets

| DivertingLegInformation2 operation content definition | | Example of content |
|---|---|---|
| ARGUMENT SEQUENCE | OPERATION | |
| diversionCounter | INTEGER (1,2......) | 01 |
| diversionReason | DiversionReason | Call Forwarding Busy |
| originalDiversionReason | [0] IMPLICIT DiversionReason OPTIONAL | e.g. Call Forwarding Busy. None as optional |
| divertingNumber | PresentedNumberUnscreened OPTIONAL | 4101 (directory number of redirecting party 8) |
| originalCalledNumber | [2] PresentedNumberUnscreened OPTIONAL | 4101 (directory number of redirecting party 8) |
| redirectingName | [3] Name OPTIONAL | Bobby (name of redirecting party 8) |
| originalCalledName | [4] Name OPTIONAL | None as optional |
| extension | CHOICE<br><br>[5] IMPLICIT Extension<br>[6] IMPLICIT SEQUENCE OF Extension | see Fig. 7B |

Fig. 7A

| Extension content definition | | Example of Content |
|---|---|---|
| Extension: SEQUENCE | | |
| manufacturer | EXTENSION | Manufacturer Specific Object Identifier |
| ANY DEFINED BY | manufacturer | Information indicating the type of diversion method used, i.e. either Forward Switching or Rerouting |

PATH REPLACEMENT SCHEME

The present invention relates to a telecommunications network which supports path replacement, a method of operating such a system, nodes for use in such a system, methods of operating such nodes.

TECHNICAL BACKGROUND

Conventional circuit switched telecommunication networks set up a connection between two subscribers along a path which may include one or more switches and a variety of network transmission elements such as a trunked wireline telephone system, an optical fiber link, a microwave link, a mobile phone (wireless) link, a cordless telephone link, etc. Circuit switching means that a route between the calling party and the called party is set up at the start of a call and is maintained for the call unless there is a requirement for path replacement. Depending on how the call is set up it may not be routed suitably for a variety of reasons, e.g. for cost to the calling subscriber, for transmission quality or for circuit efficiency. Path replacement relates to setting up a new path on an existing circuit connection in a telecommunications network when it is determined that the connection is not optimal. A conventional path replacement procedure (ANF PR) is described in the standards ISO/IEC 13863, First Edition Jan. 11, 1995, "Information Technology—Telecommunications and Information exchange between systems—Private Integrated Services network—Specification, functional model and information flows—Path Replacement additional network feature" and ISO/IEC 13874, First Edition Jan. 11, 1995, "Information Technology—Telecommunications and information exchange between systems—Private Integrated Services Network—Inter-Exchange signaling protocol—Path replacement additional network feature" in conjunction with ISO/IEC standard 13873, Mar. 17, 1995, "Information Technology—Telecommunications and information exchange between systems—Private Integrated Services Network—Inter-Exchange Signaling Protocol—Call Diversion Supplementary Services".

This ANF PR is an additional network feature (ANF) and is applicable to certain basic services defined in ISO/IEC 11574. It allows replacement of an active call connection (established call) by a new connection through a private integrated services telecommunication network (PISN), in particular networks configured as integrated services digital networks (ISDN). The replacement is used in order to obtain a more suitable path between the two parties involved in the call. Reasons for such a path replacement may be indirect cost reduction, change of bearer capability, poor quality of service or for maintenance actions, as explained in Appendix A of ISO/IEC 13863. For instance, ANF PR is supposed to be invoked on receipt of knowledge of a non-suitable connection. If that knowledge is not available ANF PR may be invoked automatically on every type of supplementary services call (SS call) or simple call which may not be optimal, e.g. after call modification due to call diversion or forwarding, call transfer, termination of an add-on conference, or a transfer-by-join created call. Supplementary services are defined in the standard CCITT Rec. 1.210, for instance. Further, ANF PR may be invoked on permanent calls (nailed-up calls) for instance when maintenance is required on some of the equipment in the path.

It is not specified how the above standards are to be implemented, in particular it is not specified how to obtain the indication of an unsuitable path nor how to gain knowledge necessary to decide whether or not path replacement is to be invoked. Further, some supplementary services may be implemented using different methods, some of which result in optimum paths and some which do not. As there is no way to distinguish between these equivalent methods, it is conventional to recommend automatic path replacement even in situations when this could be avoided. The result is unnecessary and useless replacement attempts on calls which have an optimal routing already. The ISO/IEC 13863 standard contains a standard ANF PR routine when the old connection is at least partly retained and even contains a useless routine of attempting ANF PR when the complete old connection is retained, i.e. the old connection cannot be improved (was optimum anyway) and the ANF PR is terminated successfully by retaining the old connection.

It is anticipated that as telecommunication systems become more intelligent, the variety of methods of carrying out supplementary services will increase, hence there will be more situations in which more than one method may be used for carrying out supplementary services. Further, manufacturers of telecommunications hard- and software supplying to an international market will need to deliver systems in which the various methods may be selected or deactivated dependent upon the target application.

It is an object of the invention to provide a telecommunication system, a method of operating such a system and a node suitable for such a system in which unnecessary call replacement procedures are reduced and thus to improve the efficiency of the system.

It is a further object of the invention to provide a telecommunication system, a method of operating such a system and a node for such a system in which, despite alternative methods of implementing a particular supplementary service, path replacement procedures are carried out efficiently.

SUMMARY OF THE INVENTION

The present invention provides a method of using an identifier to identify the routing method selected from at least two routing methods for a call between at least two nodes of a telecommunications network and to allow path replacement invocation or not for the call depending upon said identifier. The call may include a supplementary service such as call forwarding busy, call forwarding unconditional or call forwarding no reply. The routing method used for the supplementary service call may include forward switching or rerouting.

The present invention also includes a telecommunication system supporting path replacement after a call, comprising: means for establishing at least a leg of a call between a first node of the system and a second node of the system, said call establishing means including means for introducing an identifier of which routing method from at least two routing methods is being used for the call in at least one of the messages received by at least one of said first and second nodes during establishment of the call.

The present invention also provides a method of operating a telecommunications network supporting path replacement after a supplementary service call, comprising the steps of: establishing at least one leg of a supplementary service call between a first node of the network and a second node of the network, and providing an identifier of the call routing method for the supplementary service call in at least one of the messages received by at least one of said first and second nodes during establishment of the supplementary call.

The present invention provides a telecommunication system which supports path replacement after a supplementary service call, comprising: means for establishing at least a leg of a supplementary service call between a first node of the system and a second node of the system, said call establishing means including an identifier of which routing method is being used for the supplementary service call in at least one of the messages received by at least one of said first and second nodes during establishment of the call.

The present invention also provides a node for use with a telecommunication system which supports path replacement after establishment of a supplementary service call, comprising: means for establishing at least a leg of a supplementary service call with a further node of the system, said call establishing means being adapted to include an identifier of which routing method is being used for the supplementary service call in at least one of the messages sent to said further node.

The present invention also provides a node for use with a telecommunication system which supports path replacement after establishment of a supplementary service call, comprising: means for receiving messages related to a supplementary service call, said messages including an identifier of which routing method is being used for the supplementary service call, and means for invoking or suppressing path replacement for said supplementary service call in response to the receipt of said routing method identifier.

The present invention also provide a node for use with a telecommunication system which supports path replacement after establishment of a supplementary service call, comprising: means for receiving at least one first message related to a supplementary call from a first node of the telecommunication network, and means responsive to receipt of said at least one first message for establishing a second call of the supplementary service call with a second node of the telecommunications network, said second call establishing means being adapted to include an identifier of which routing method is being used for the supplementary service call in at least one message sent to said second node as part of said second call.

The present invention provides a method of operating a node in an telecommunications network, said node supporting path replacement after a supplementary service call, comprising: receiving messages at said node related to a supplementary service call, said messages including an identifier of which routing method is being used for the supplementary service call, and invoking or suppressing path replacement for said supplementary service call in response to the receipt of said routing method identifier.

The present invention may provide the advantage of an improved call replacement scheme which can be carried out within the currently available standards for telephony.

The present invention may provide the advantage that unnecessary path replacement attempts may be reduced.

Embodiments and further advantages of the present invention will now be described with reference to the following drawings. The dependent claims define further embodiments of the present invention.

DESCRIPTION OF THE ILLUSTRATIVE EMBODIMENTS

In the following the present invention will be described with reference to certain embodiments and with reference to the drawings but the present invention is not limited thereto but only by the claims. In particular, the present invention will be described with reference to call diversion merely as an example of the invention, but the present invention is not limited to this one application. The present invention may be applied to any telecommunication system, whether digital or analogue, which supports path replacement. In particular, the present invention may be applied to any telecommunication system which supports supplementary services. Further, the present invention may be applied to any telecommunication system in which a supplementary service such as call forwarding can be implemented by two or more alternative methods.

Figure 1:
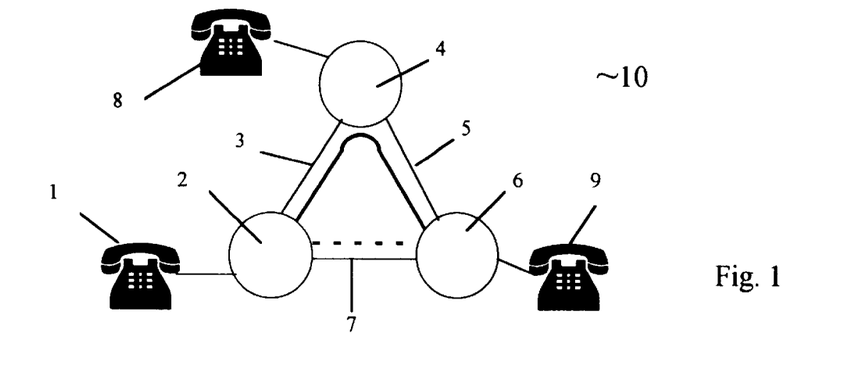
FIG. 1 is a schematic representation of node connections during path replacement.
Figure 2:
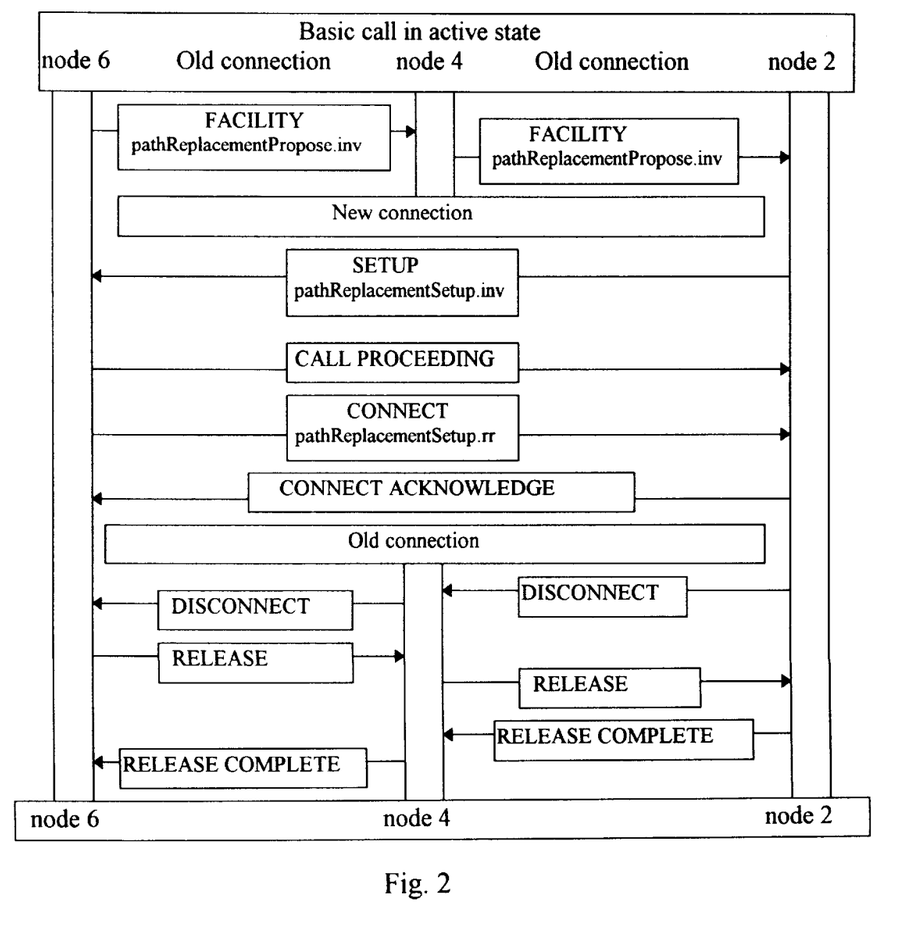
FIG. 2 is a schematic representation of the call messages for a path replacement.

Before explaining the invention in detail, conventional ANF PR will be described, as well as the supplementary service of call diversion, in particular call forwarding which will be used as an example of the present invention. With reference to FIGS. 1 and 2, the different steps of one version of ANF PR in a telecommunications system 10 will be described briefly once an active call connection 3, 5 is established between originating and terminating parties 1, 9 via nodes 2, 4, 6. This ANF PR procedure is described in more detail in the standards ISO/IEC 13863 and 13874. FIG. 2 is basically the same as FIG. C.1 of ISO/IEC 13874 but amended to show only three nodes in total for the old connection rather than four. In accordance with the present invention a FACILITY message may be as described in the standard ISO 11 582.

Step 1. A FACILITY message including a proposal (PathReplacePropose.inv) to initiate a new optimum call is sent by the terminating user's node 6 to the originating user's node 2 via node 4.

Step 2. The originating user's node 2 tries to establish a new call (SETUP, PathReplaceSetup.inv) using an optimum path 7 between node 2 and 6 while the initial call is still active.

Step 3. The terminating user's node 6 attempts to answer (CALL PROCEEDING) and establish the new call (CONNECT, PathReplaceSetup.rr).

Step 4. If the new call connection 7 is successful (CONNECT ACKNOWLEDGE) it replaces the initial call 3, 5 (DISCONNECT) which is released (RELEASE, RELEASE COMPLETE). As a result, only one link 7 is used for the call instead of two links 3, 5 before the ANF PR operation.

Figure 3:
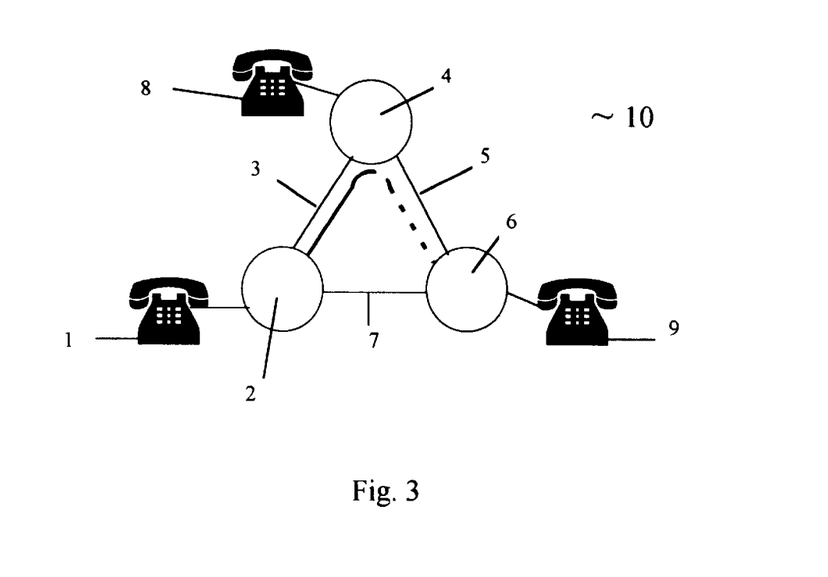
FIG. 3 is a schematic representation of the node connections during call forwarding using forward switching.
Figure 4:
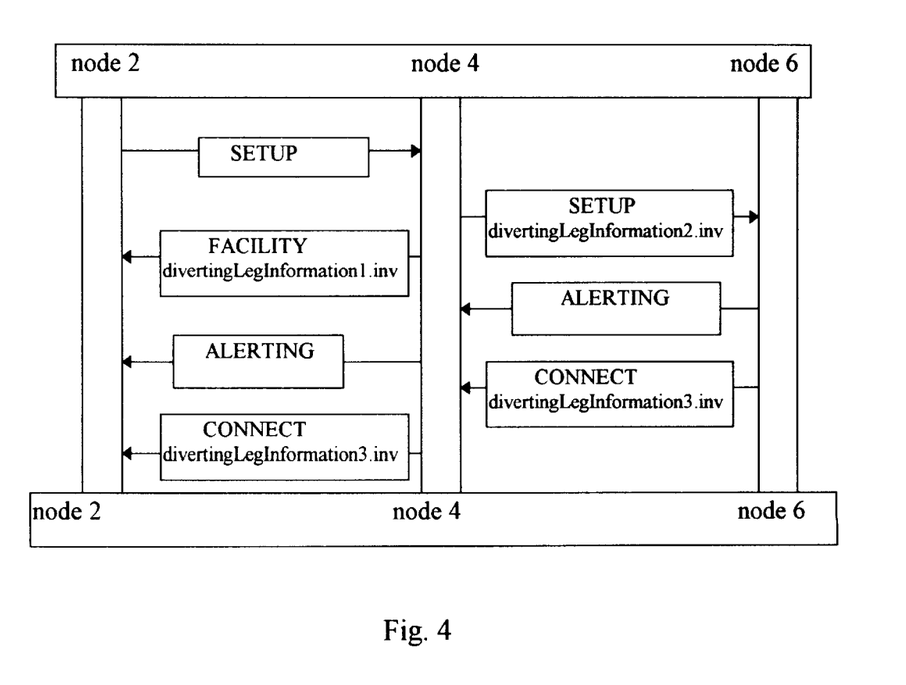
FIG. 4 is a schematic representation of the call messages for call forwarding when busy using forward switching.

The supplementary service of call forwarding (SS CF) may include Call Forwarding Unconditional, Call Forwarding Busy and Call Forwarding No Reply. The SS CF may perform the call forward redirection using various alternative methods, e.g. Forward Switching (FS) or Rerouting (RR). Conventional forward switching and rerouting message sequences are described in the standard ISO/IEC 13873. A conventional forward switching method for call forwarding busy according to ISO/IEC 13873 will be explained referring to FIGS. 3 and 4 as just one example of a supplementary service call. FIG. 4 is basically the same as FIG. D-2.1.1 of ISO/IEC 13873. Further details and alternative message sequences may be found in the standard.

Figure 7A:
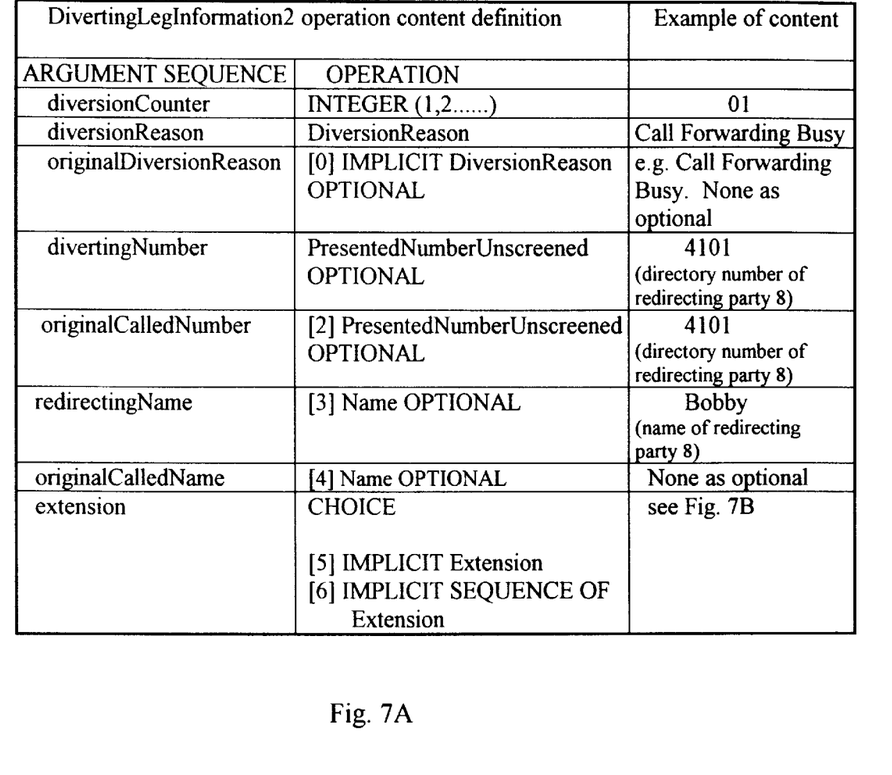
FIGS. 7A and 7B are schematic representations of the contents of DivertingLegInformation2 in accordance with the present invention.

Step 1. After an initial call from the originating party 1 (SETUP) reaches the redirecting node 4, a call towards the diverted-to party 9 is set up from the redirecting user's node 4 (SETUP). The call set-up to the diverted-to party 9 includes the information DivertingLeginformation2. DivertingLeginformation2 includes among other information an indication of the reason for the redirection, e.g. call forwarding busy as best shown in FIG. 7A. Further, the redirecting user's node 4 sends a FACILITY message to the originating node 2 on the call leg 3 including the information DivertingLeginformation1.

Step 2. Upon receipt of the new call, the diverted-to user's node 6 attempts to answer (ALERTING).

Step 3. The diverted-to node 6 sends information DivertingLeginformation3 towards the originating node 2 (CONNECT) via node 4. At the end of the procedure, originating party 1 and diverted-to party 9 are in a call via node 4 having two legs 3, 5 which does not use an optimum path as a shorter one 7 is available between nodes 6 and 2.

Figure 5:
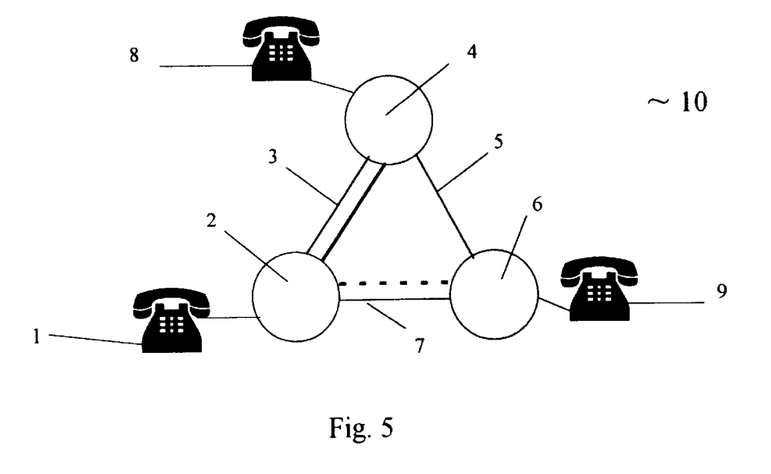
FIG. 5 is a schematic representation of the node connections during call forwarding when busy using rerouting.
Figure 6:
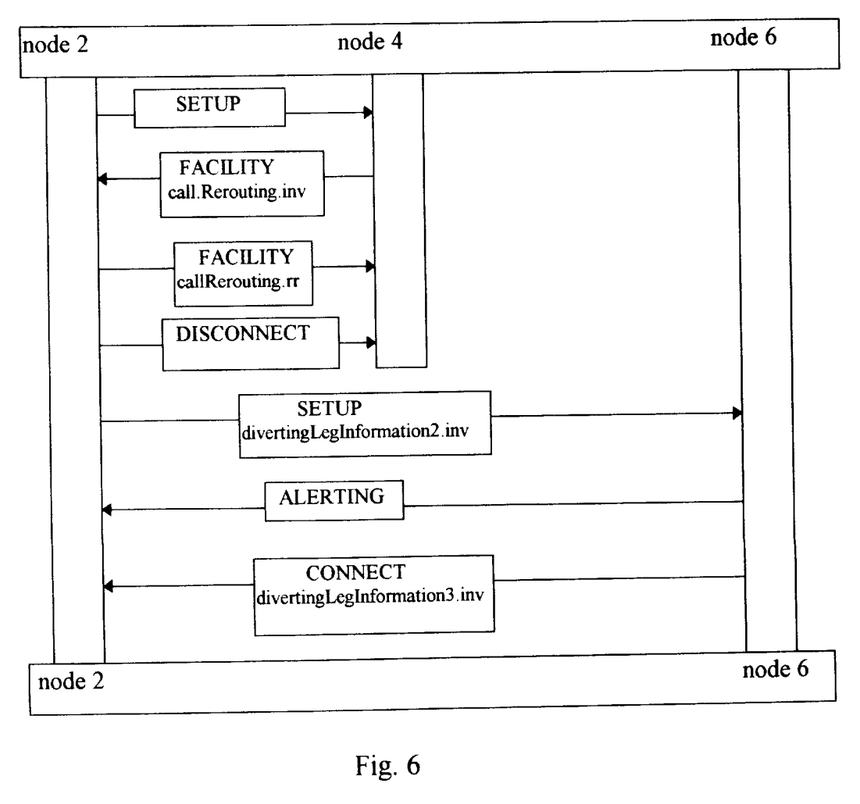
FIG. 6 is a schematic representation of the call messages for call forwarding when busy using rerouting.

A conventional rerouting method of call forwarding busy in accordance with ISO/IEC 13873 will be described briefly referring to FIGS. 5 and 6 as a further example of a supplementary service call. FIG. 6 is basically the same as FIG. D-1.1.1 of ISO/IEC 13873. Further details including alternative message sequences may be found in the standard.

Step 1. After an initial call (SETUP) from the originating party 1 has reached the redirecting party 8, a request (FACILITY) is sent from the redirecting user's node 4 towards the originating user's node 2. This request (callRerouting.inv) asks the originating user's node 2 to initiate a new call towards the diverted-to party 9.

Step 2. Upon receipt of the new call request, the originating user's node 2 first confirms the rerouting request (FACILITY, callRerouting.rr) and releases the call to node 4 along path 3 (DISCONNECT) between parties 1 and 8. Then the originating node 2 initiates a new call towards the diverted-to party 9 (SETUP). This new call set-up includes the information DivertingLeginformation2.

Step 3. Upon receipt of the new call, the diverted-to user's node 6 attempts to answer this request (ALERTING).

Step 4. The diverted-to node 6 sends DivertingLeginformation3 towards the originating node 2 (CONNECT). The final result of the procedure is that the originating and diverted-to parties 1, 9 are in a call which uses an optimum path 7.

In the above examples, the diverted-to user's node 6 receives DivertingLeginformation2 independent of which method is used to complete call forwarding busy. As ANF PR is initiated from the terminating user's node, in this case node 6, no distinction can be made by this node between rerouting and forward switching call forwarding operations. The information in DivertingLeginformation2 relating to the reason for the diversion is in each case simply the type of call forwarding, e.g. "call forwarding busy".

An ANF PR may be activated conventionally once an indication shows that a call is probably not using an optimum path. However, if the diversion was carried out using the rerouting method, the activation of the ANF PR is useless as an optimum path 7 already links the two parties 1, 9 of the call.

In accordance with the present invention means are provided for transferring information relating to which method was used to perform the diversion. In accordance with the present invention, such information may be provided in one of the call messages received at the diverted-to user's node 6. One of the indications that can be used in accordance with the present invention is a specific information received at the diverted-to user's node 6 contained within the new call establishment, i.e. within DivertingLeginformation2. In accordance with one embodiment of the present invention a field is provided in the information DivertingLeginformation2 which provides an indication of which call diversion method has been used.

Figure 7B:
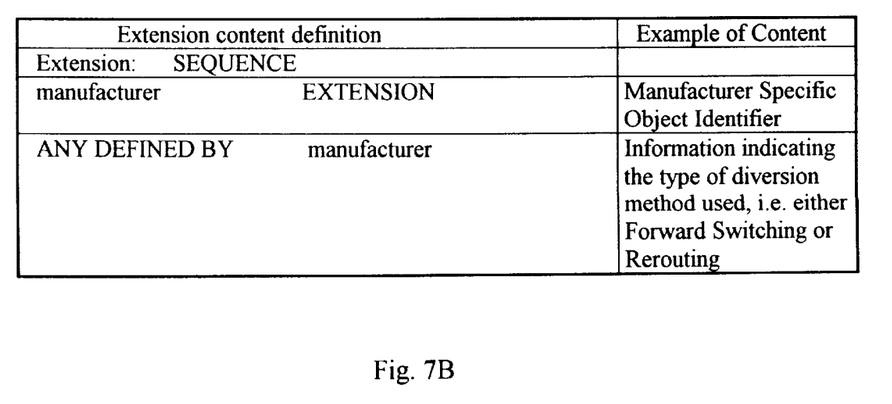

In one embodiment of the present invention an indicator of the method of call diversion used, e.g. either forward switching (FS) or rerouting (RR), is contained within a manufacturer's specific information extension in DivertingLeginformation2. Manufacturer specific additions to standardized operations are defined in the standard ISO 11 582, "Information Technology—Private Integrated Services network—generic Functional Protocol for the support of supplementary services—Interchange signaling procedures and protocol". An example of a DivertingLeginformation2 information in accordance with the present invention is given in FIGS. 7A and 7B. In accordance with the present invention there are several ways of providing the necessary diversion method information in an extension, all of which are individual embodiments of the present invention. For example, in a system in which ANF PR is suppressed unless specifically requested, it is advantageous to include an indication of a forward switching process in the extension so that the terminating node 6 may invoke ANF PR on receipt of this information. On the other hand, in a system in which ANF PR is normally invoked automatically unless suppressed, it is advantageous to include an indication in the extension of a rerouting call diversion, so that the terminating node 6 may suppress ANF PR on receipt of this information.

Figure 9:
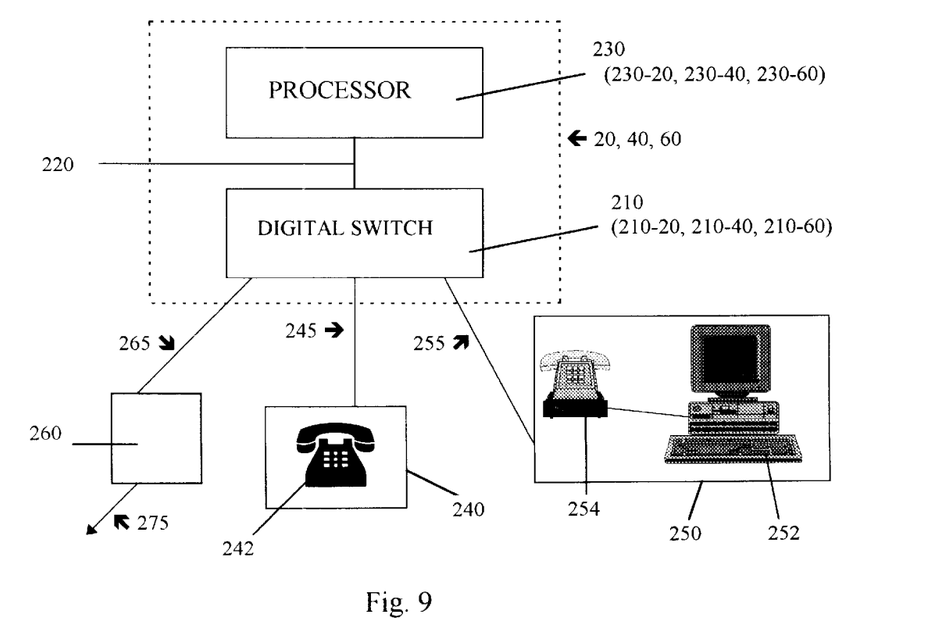
FIG. 9 is a schematic representation of a node of a telecommunications network in accordance with the present invention.
Figure 10:
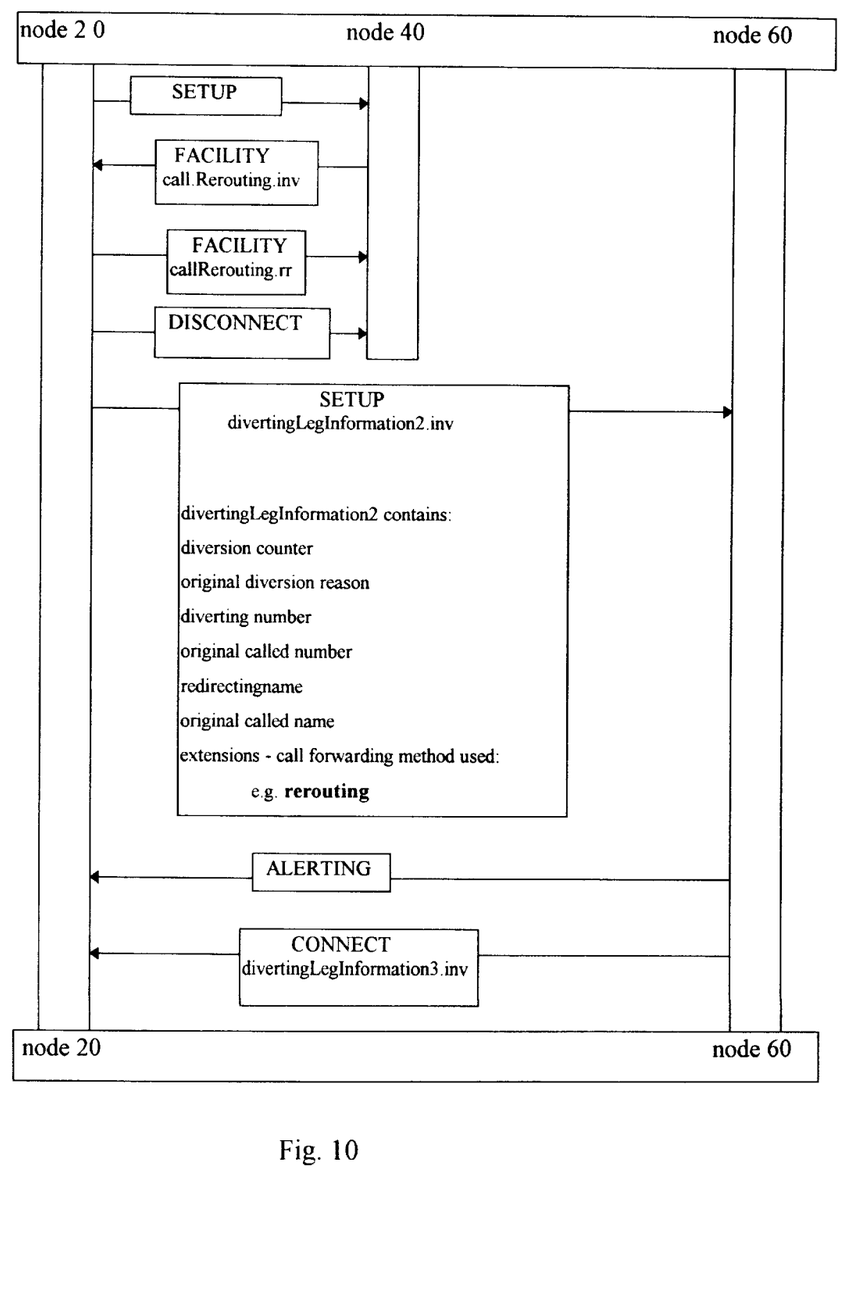
FIG. 10 is a schematic representation of the call messages for call forwarding when busy using rerouting in accordance with the present invention.

A detailed embodiment of the present invention will now be described with reference to FIGS. 8, 9 and 10. A telecommunication system 100 is shown schematically in FIG. 8 including users terminating devices 15, 80 and 90 linked to nodes 20, 40, 60 respectively which are themselves linked together by network paths 30, 50 and 70. The telecommunication system 100 is shown as a conventional wire telephone system but the invention is not limited thereto. Further each network path 30, 50, 70 may include a further telecommunications network 35, 55, 75 respectively. The networks 35, 55, 75 may be public switched telephone networks (PSTN) or a private integrated services network (PISN) or similar. Each node 20, 40, 60 may be, for example, a voice and data digital switching system 20, 40, 60 as shown schematically in FIG. 9, which may be a Meridian 1 digital switching system as supplied by Northern Telecom, Ontario, Canada. Meridian is a registered trade mark of Northern Telecom. Each digital switching system 20, 40, 60 may be part of a private branch exchange, a private automatic exchange or a key telephone system. Each digital switching system 20, 40, 60 may include a digital switch 210 connected to an application processor 230 via a bus 220. The application processor 230 provides the control element for controlling the digital switch 210. Application processor 230 is an application platform on which all applications run for the respective node 20, 40, 60 including supplementary services. To carry out the applications implemented in software form, the application processor 230 may include at least a central processing unit (CPU) and a memory store. The memory store may include program memory as well as a database memory for storing details of the subscribers and the subscriber profiles. The subscriber profiles record for which services the relevant subscriber is registered. The database memory may be an integral part of the application processor 230 or may be part of a separate storage facility. Typically, application processor 230 may include a CPU, miscellaneous CPU registers, system memory, database memory, an input/output devices and a power supply. The application processor 230 may include a microprocessor with associated memory and input/output devices as found in a conventional personal computer. Which applications may run on a particular node 20, 40, 60 depends upon the software programmed into the application processor 230.

The digital switch 210 is connected to terminals or peripheral interfaces 240, 250, 260 by means of time division multiplex (TDM) busses 245; 255; 265 respectively. A plurality of terminating devices 242, 252, 254 may connected to each terminals 240, 250, 260, such as any type of suitable telephone set 242, a personal computer 252 or similar which may be connected either directly to the terminal 250 or via a modem 254, or via other telecommunications networks. The digital switch 210 may also be connected to other digital switching systems via a transmission line or trunk 275 and terminal 260 which is connected to the digital switch 210 by a TDM bus 265. Terminal 260 may be a circuit card pluggable into the cabinet of the application processor 230. Alternatively, the digital switch 210 may connected to another digital switching system via a tie-line.

Figure 8:
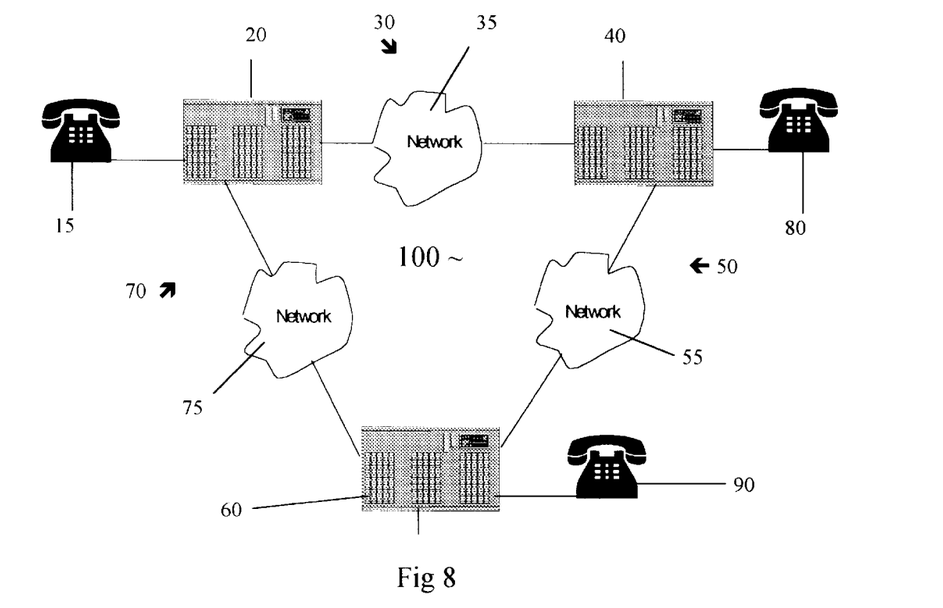
FIG. 8 is a schematic representation of a telecommunications network in accordance with the present invention supporting path replacement.

One embodiment of the method in accordance with the present invention will be described for the supplementary service call forwarding busy and with reference to the schematic representation of the message flow shown in FIG. 10 and the system 100 as shown in FIG. 8. The components of nodes 20, 40, 60 will be identified by an extension, e.g. the application processor 230 of FIG. 9 is represented by the reference numeral 230-20 for node 20, 230-40 for node 40 and 230-60 for node 60. Other components of these nodes are referenced in a similar manner. When a call forwarding busy by rerouting is to be carried out in a system 100 which supports automatic path replacement unless suppressed, a call is first requested from the originating node 20 by the originating user 15 to the user 80 connected to the redirecting node 40 via path 30 (SETUP). In the redirecting node 40, the digital switch 210-40 in cooperation with the processor 230-40 identifies that the called party 80 is busy and that the called party subscriber profile allows call forwarding when busy. The application processor 230-40 initiates the sending of a request (FACILITY, callRerouting.inv) to the originating node 20 to perform a rerouting to the diverted-to user 90. In the originating node 20, the digital switch 210-20 of this node sends the message information to the application processor 230-20 of this node 20. On examining the received message callRerouting.inv the application processor 230-20 of node 20 sends a message (DISCONNECT) to the redirecting node 40 to disconnect the call leg between the originating node 20 and the redirecting node 40. The application processor 230-20 of originating node 20 also sends a call setup request (SETUP) to node 60 along path 70 including DivertingLeginformation2 information which contains, in a manufacturer's specific extension, an indication of a routing method used. On receipt of the call set-up request at the diverted-to node 60, the digital switch 210-60 of node 60 transmits the message information to the application processor 230-60 of this node. Application processor 230-60 of node 60 examines the diversion reason information in divertingLeginformation2 and answers the originating node 20 with a message (CONNECT) including the DivertingLeginformation3. Further, on receipt of the DivertingLeginformation2 carrying the manufacturer's specific extension information which indicates that the call forwarding was carried out by rerouting, the application processor 230-60 of node 60 inactivates for this new call any ANF PR which would normally be automatically invoked by such a terminating node 60 after receipt of a supplementary service connection. Subsequently, the new call is connected across path 70. In accordance with the present invention, an unnecessary automatic ANF PR is avoided because the call forwarding was carried out by a procedure, rerouting, which provided an optimum path. If the call forwarding had been carried out by forward switching, the DivertingLeginformation2 would have contained no information or neutral information so that an ANF PR would have been carried out automatically, i.e. not suppressed, by terminating node 60.

In an alternative embodiment of the present invention, the telecommunication system 100 is configured so that ANF PR is only invoked when specifically requested. In this case the DivertingLeginformation2 contains a specific identifier in the extension when the method "forward switching" has been used for call forwarding. With forward switching a non-optimal path is established for the call. Hence, the terminating node (60 in the embodiments of the invention) use the identifier to invoke path replacement. If rerouting had been used, the final call path would be optimum. In this case, the extension would contain no identifier or neutral information, so that no path replacement would be invoked by the terminating node 60.

In accordance with the present invention, the information relating to the routing method used for the supplementary service, e.g. forward switching or rerouting, is not limited to being included in divertingLeginformation2. The information may be included in a separate FACILITY message sent to the diverted-to node 60.

Figure 11:
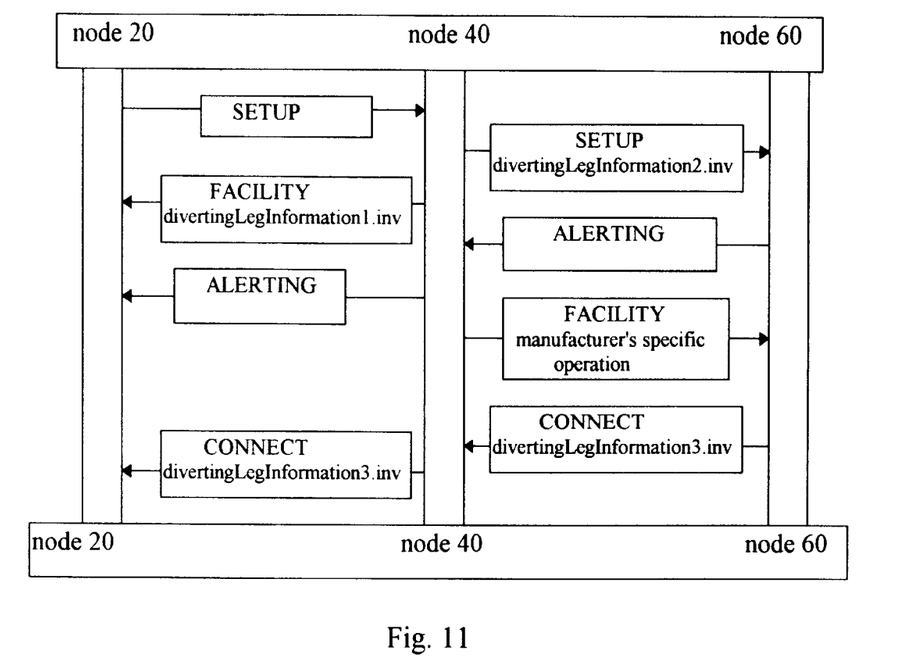
FIG. 11 is a schematic representation of the call messages for call forwarding when busy or call forwarding unconditional using forward switching in accordance with another embodiment of the present invention.

A further embodiment of the present invention will be described with reference to the schematic message sequence of FIG. 11 for the supplementary service call forwarding busy or call forwarding unconditional using forward switching. This embodiment may be carried out with the system 100 as described with reference to FIG. 8. The message sequence is basically as described with reference to FIG. 4, except the nodes 2,4 and 6 have been replaced by the nodes 20, 40 and 60 of FIG. 8. In particular steps 1 and 2 are identical. However after step 2, a FACILITY message is sent from re-directing node 40 to diverted-to node 60. This specific FACILITY message contains information with respect to the method of carrying out the call, i.e. in this case forward switching. The identifier can be included in the form of a manufacturer's specific operation as described for instance in the standard ISO 11582. The information relating to the method of completing the supplementary call is in the form of an OBJECT IDENTIFIER as described for instance in Appendix D of ISO 11 582. Finally, in step 3, the diverted-to node 60 sends information DivertingLeginformation3 towards the originating node 20 (CONNECT) via node 40. At the end of the procedure, originating party 15 and diverted-to party 90 are in a call 30, 50 via node 40 which does not use an optimum path as a shorter one 70 is available between nodes 60 and 20. Having received the specific FACILITY message in step 2 including the information relating to the method for completing the call, namely forward switching, the application processor 230-60 of node 60 invokes ANF PR as the call is not optimal.

Figure 12:
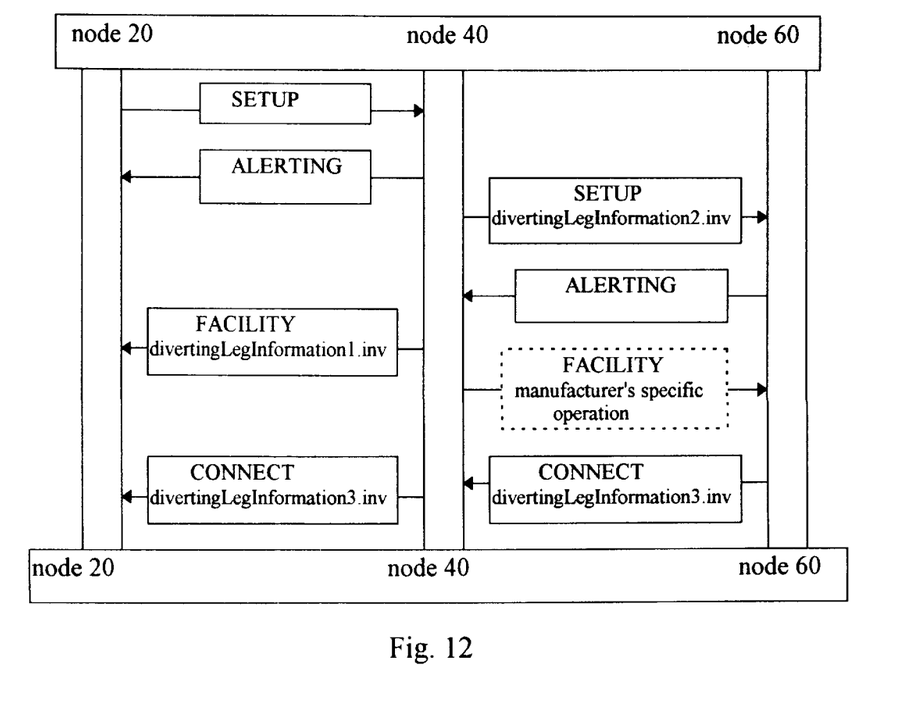
FIG. 12 is a schematic representation of the call messages for call forwarding no reply using forward switching in accordance with the present invention.

Further embodiments of the present invention relating to call forwarding no reply will be described with reference to FIG. 12. FIG. 12 is a modified version of FIG. D-2.2.1 of the standard ISO/IEC 13873. In one embodiment of the present invention divertingLeginformation2 includes an indicator of the method used to complete the call forwarding, e.g. forward switching, and in a further embodiment of the present invention an additional FACILITY message including the routing method indicator is sent from the redirecting node 40 to the diverted-to node 60. The methods according to these embodiments may be implemented on the telecommunication system 100 described with reference to FIG. 8.

When a call forwarding on no reply by forward switching is to be carried out in a system 100 which does not support path replacement unless specifically requested, a call to the user 80 connected to the redirecting node 40 is first requested from the originating node 20 by the originating user 15. The application processor 230-20 of originating node 20 sends a call setup request (SETUP) to node 40 via path 30. In the redirecting node 40, the digital switch 210-40 sends a ringing tone to the originating node 20 (ALERTING). The application processor 230-40 of node 40 also identifies that the called party subscriber profile allows call forwarding on no reply and a timer is activated. After a predetermined time has elapsed and the subscriber 80 has not answered, a call towards the diverted-to party 90 is set up by the application processor 230-40 via the digital switch 210-40 from the redirecting user's node 40 (SETUP) via path 50. The call set-up message to the diverted-to node 60 may include the information DivertingLeginformation2 which includes among other information an indication of the reason for the redirection, e.g. call forwarding no reply, as best shown in FIG. 7A. In accordance with the present invention, divertingLeginformation2 also contains, in a manufacturer's specific extension, an indication of the method of carrying out the supplementary service, namely forward switching. On receipt of the call set-up request at the diverted-to node 60, the digital switch 210-60 of node 60 transmits the message information to the application processor 230-60 of this node. Application processor 230-60 of node 60 examines the diversion reason information in divertingLeginformation2 and alerts the diverting node 40 (ALERTING). Further, the redirecting user's node 40 sends a FACILITY message to the originating node 20 including the information DivertingLeginformation1. The diverted-to node 60 sends information DivertingLeginformation3 towards the originating node 20 (CONNECT) via node 40. At the end of the procedure, originating party 15 and diverted-to party 90 are in a call 30, 50 via node 40 which does not use an optimum path as a shorter one 70 is available between nodes 60 and 20. In accordance with the present invention, on receipt of the DivertingLeginformation2 carrying the manufacturer's specific extension information which indicates that the call forwarding was carried out by forward switching, the application processor 230-60 of node 60 activates an ANF PR for this new call.

As an alternative embodiment of the present invention, the scheme described above with reference to FIG. 12 is modified so that the information identifying the rerouting method (i.e. forward switching) is not contained in the divertingLeginformation2 but in a separate FACILITY message (shown bordered by dotted lines in FIG. 12) transmitted between the diverting node 40 and the diverted-to node 60 after the FACILITY message containing divertingLeginformation1 has been sent from the redirecting node 40 to the originating node 20. The identifier can be included in the form of a manufacturer's specific operation as described for instance in the standard ISO 11582. The information relating to the method of completing the supplementary call is in the form of an OBJECT IDENTIFIER as described for instance in Appendix D of ISO 11 582. The remaining steps of the method stay the same.

While only particular embodiments of the embodiment have been shown and described herein, it will be obvious that further modifications can be made without departing from the invention in its broader aspects. For example, the inventive routing method identifier in accordance with the present invention may be applied to other services with which there are more than one method of routing the call.

Accordingly, the appended claims are intended to cover all such changes and alternative methods or constructions that fall within the true scope of the present invention.

What is claimed is:

1. A method of operating a telecommunications network supporting path replacement after a supplementary service call, comprising the steps of:

establishing at least one leg of a supplementary service call between a first node of the network and a second node of the network;

providing an identifier of the call routing method for the supplementary service call in at least one of the messages received by at least one of said first and second nodes during establishment of the supplementary call; and wherein the node receiving said routing method identifier invokes or suppresses path replacement on receipt of said routing method identifier.

2. A method according to claim 1, wherein said routing method identifier is placed in at least one of the supplementary call set-up messages exchanged between said first and second node.

3. A method according to claim 1, wherein said first node is a node intermediate a third basic call originating node and said second node, said third node attempts to set up a basic call with said first node, and in response to said basic call attempt, said first node places said routing method identifier in at least one of the supplementary call set-up messages sent from said first node to said second node.

4. A method according to claim 3, further comprising the step of said second node invoking path replacement on receipt of said routing method identifier.

5. A method according to claim 1, wherein said first node is a basic call originating node, said first node attempts to set up a basic call with a third node intermediate said first and second node, said third node attempts to set up the supplementary call via said first node and said first node places said routing method identifier in at least one of the supplementary call set up messages exchanged between said first and second nodes in response to the attempt by said third node to set up the supplementary service call.

6. A method according to claim 5, wherein said second node suppresses path replacement on receipt of said routing method identifier.

7. A method according to claim 1, wherein said routing method includes one of forwarding switching and rerouting.

8. A method according to claim 1, wherein said supplementary service call includes one of call forwarding busy, call forwarding unconditional and call forwarding no reply.

9. A telecommunication system supporting path replacement after a supplementary service call, comprising:

means for establishing at least a leg of a supplementary service call between a first node of the system and a second node of the system, said call establishing means including an identifier of which routing method is being used for the supplementary service call in at least one of the messages received by at least one of said first and second nodes during establishment of the call, wherein the node receiving said identifier includes means for invoking or suppressing path replacement on receipt of said routing method identifier.

10. A telecommunications network according to claim 9, wherein said routing method identifier is placed in at least one of the supplementary call set-up messages exchanged between said first and second node.

11. A telecommunications network according to claim 9, wherein said first node is a node intermediate a third basic call originating node and said second node, said third node attempts to set up a basic call with said first node, and in response to said basic call attempt, said first node places said routing method identifier in at least one of the supplementary call set-up messages sent from said first node to said second node.

12. A telecommunications network according to claim 11, wherein said second node includes means for invoking path replacement on receipt of said routing method identifier.

13. A telecommunication network according to claim 9, wherein said first node is a basic call originating node, said first node attempts to set up a basic call with a third node intermediate said first and second node, said third node attempts to set up the supplementary call via said first node and said first node places said routing method identifier in at least one of the supplementary call set up messages exchanged between said first and second nodes in response to the attempt by said third node to set up the supplementary service call.

14. A telecommunications network according to claim 13, wherein said second node includes means for suppressing path replacement on receipt of said routing method identifier.

15. A telecommunications network according to claim 9, wherein said routing method includes one of forwarding switching and rerouting.

16. A telecommunications network according to claim 9, wherein said supplementary service call includes one of call forwarding busy, call forwarding unconditional and call forwarding no reply.

17. A node for use in a telecommunication network supporting path replacement after a supplementary service call, comprising:

means for establishing at least a leg of a supplementary service call with a further node of the system, said call establishing means being adapted to include an identifier of which routing method is being used for the supplementary service call in at least one of the messages sent to said further node, the identifier being indicative of whether path replacement is to be suppressed or invoked.

18. A node according to claim 17, wherein said routing method includes one of forwarding switching and rerouting.

19. A node according to claim 18, wherein said supplementary service call includes one of call forwarding busy, call forwarding unconditional and call forwarding no reply.

20. A node for use in a telecommunication network supporting path replacement after a supplementary service call, comprising:

means for receiving messages related to a supplementary service call, said messages including an identifier of which routing method is being used for the supplementary service call, and means for invoking or suppressing path replacement for said supplementary service call in response to the receipt of said routing method identifier.

21. A node according to claim 20, wherein the routing method includes one of forwarding switching and rerouting.

22. A node according to claim 20, wherein said supplementary service call includes one of call forwarding busy, call forwarding unconditional and call forwarding no reply.

23. A node for use in a telecommunication network supporting path replacement after a supplementary service call, comprising:

means for receiving at least one first message related to a supplementary call from a first node of the telecommunication network, and means responsive to receipt of said at least one first message for establishing a second call of the supplementary service call with a second node of the telecommunications network, said second call establishing means being adapted to include an identifier of which routing method is being used for the supplementary service call in at least one message sent to said second node as part of said second call, the identifier being indicative of whether path replacement is to be suppressed or invoked.

24. A node according to claim 23, wherein the rerouting method includes one of forwarding switching and rerouting.

25. A node according to claim 23, wherein said supplementary service call includes one of call forwarding busy, call forwarding unconditional and call forwarding no reply.

26. A method of operating a node in a telecommunications network, said node supporting path replacement after a supplementary service call, comprising:

receiving messages at said node related to a supplementary service call, said messages including an identifier of which routing method is being used for the supplementary service call, and invoking or suppressing path replacement for said supplementary service call in response to the receipt of said routing method identifier.

27. A method according to claim 26, wherein said routing method includes one of forwarding switching and rerouting.

28. A method according to claim 26, wherein said supplementary services call includes one of call forwarding busy, call forwarding unconditional and call forwarding no reply.

29. A method of using an identifier to identify the r outing method selected from at least two routing methods for inclusion in a call between at least two nodes of a telecommunications network and to invoke or suppress path replacement for the call depending upon said routing method identifier.

30. A method according to claim 29, wherein the routing method for the call includes one of forwarding switching and rerouting.

31. A method according to claim 29, wherein said call includes one of call forwarding busy, call forwarding unconditional and call forwarding no reply.

32. A telecommunication system supporting path replacement after establishment of a call, comprising:

means for establishing at least a leg of a call between a first node of the system and a second node of the system, said call establishing means including means for introducing an identifier of which routing method from at least two routing methods is being used for the call in at least one message received by at least one of said first and second nodes during establishment of the call, the identifier being indicative of whether path replacement is to be suppressed or invoked.

33. A telecommunications system according to claim 32, wherein the routing method for the call includes one of forwarding switching and rerouting.

34. A telecommunications system according to claim 32, wherein said means for establishing a call includes establishing the call by one of call forwarding busy, call forwarding unconditional and call forwarding no reply.

* * * * *